United States Patent
Gope

(10) Patent No.: US 11,694,361 B2
(45) Date of Patent: *Jul. 4, 2023

(54) CAMERA AUTO-CALIBRATION SYSTEM

(71) Applicant: Nortek Security & Control LLC, Carlsbad, CA (US)

(72) Inventor: Chandan Gope, Cupertino, CA (US)

(73) Assignee: Nortek Security & Control LLC, Carlsbad, CA (US)

( * ) Notice: Subject to any disclaimer, the term of this patent is extended or adjusted under 35 U.S.C. 154(b) by 192 days.

This patent is subject to a terminal disclaimer.

(21) Appl. No.: 17/190,010

(22) Filed: Mar. 2, 2021

(65) Prior Publication Data

US 2021/0183104 A1 Jun. 17, 2021

Related U.S. Application Data

(63) Continuation of application No. 16/449,232, filed on Jun. 21, 2019, now Pat. No. 10,964,058.

(51) Int. Cl.
*G06V 10/00* (2022.01)
*G06T 7/80* (2017.01)
*G06T 7/70* (2017.01)
*G06T 7/20* (2017.01)
*H04N 23/661* (2023.01)

(52) U.S. Cl.
CPC ............... *G06T 7/80* (2017.01); *G06T 7/20* (2013.01); *G06T 7/70* (2017.01); *H04N 23/661* (2023.01); *G06T 2207/30204* (2013.01)

(58) Field of Classification Search
CPC .... G06T 7/80; G06T 7/20; G06T 7/70; G06T 7/207; G06T 7/40; G06T 7/564; G06T 7/60; G06T 7/0075; G06T 7/0022; G06T 7/0081; G06T 7/0083; G06T 2207/10012; G06T 2207/10016; G06K 9/0063; H04N 13/239; H04N 5/23206

See application file for complete search history.

(56) References Cited

U.S. PATENT DOCUMENTS 6,115,052 A 9/2000 Freeman et al.
7,149,325 B2 12/2006 Pavlidis et al.
7,215,362 B2 * 5/2007 Klose .................. H04N 9/3185
348/180

(Continued)

OTHER PUBLICATIONS

"U.S. Appl. No. 16/449,232, Non Final Office Action dated Oct. 6, 2020", 10 pgs.

(Continued)

*Primary Examiner* — Amir Alavi
(74) *Attorney, Agent, or Firm* — Schwegman Lundberg & Woessner, P.A.

(57) ABSTRACT

A seed camera disposed a first location is manually calibrated. A second camera, disposed at a second location, detects a physical marker based on predefined characteristics of the physical marker. The physical marker is located within an overlapping field of view between the seed camera and the second camera. The second camera is calibrated based on a combination of the physical location of the physical marker, the first location of the seed camera, the second location of the second camera, a first image of the physical marker generated with the seed camera, and a second image of the physical marker generated with the second camera.

20 Claims, 12 Drawing Sheets

(56) References Cited

U.S. PATENT DOCUMENTS

| | | | | |
|---|---|---|---|---|
| 7,424,174 | B2 * | 9/2008 | Furuhashi | G06T 7/55 382/286 |
| 7,446,797 | B2 * | 11/2008 | Lee | H04N 7/18 382/103 |
| 7,450,735 | B1 | 11/2008 | Shah et al. | |
| 7,483,049 | B2 | 1/2009 | Aman et al. | |
| 7,512,261 | B2 | 3/2009 | Lou et al. | |
| 7,619,647 | B2 | 11/2009 | Wren et al. | |
| 7,697,839 | B2 | 4/2010 | Cutler | |
| 7,775,439 | B2 | 8/2010 | Kimber et al. | |
| 8,077,906 | B2 * | 12/2011 | Yu | G06T 7/80 382/104 |
| 8,089,555 | B2 * | 1/2012 | Vakrat | H04N 9/04557 348/335 |
| 8,259,174 | B2 * | 9/2012 | Zhang | G06T 7/73 348/148 |
| 8,436,904 | B2 * | 5/2013 | Li | G06T 7/80 348/47 |
| 8,477,241 | B2 | 7/2013 | Chang et al. | |
| 9,286,678 | B2 * | 3/2016 | Zhu | G06T 7/80 |
| 9,438,897 | B2 * | 9/2016 | Barreto | H04N 17/002 |
| 9,633,434 | B2 | 4/2017 | Schlattmann et al. | |
| 10,006,981 | B2 * | 6/2018 | Tidhar | G01S 3/04 |
| 10,029,622 | B2 * | 7/2018 | Brown | G06K 9/6256 |
| 10,964,058 | B2 * | 3/2021 | Gope | H04N 5/23206 |
| 2011/0063403 | A1 * | 3/2011 | Zhang | G06V 40/167 348/E7.083 |
| 2015/0196839 | A1 | 7/2015 | Ehrman | |
| 2019/0364206 | A1 | 11/2019 | Dal Mutto et al. | |
| 2020/0402258 | A1 | 12/2020 | Gope | |

OTHER PUBLICATIONS

"U.S. Appl. No. 16/449,232, Notice of Allowance dated Nov. 24, 2020", 8 pgs.

"U.S. Appl. No. 16/449,232, Response filed Oct. 12, 2020 to Non Final Office Action dated Oct. 6, 2020", 9 pgs.

* cited by examiner

US 11,694,361 B2

CAMERA AUTO-CALIBRATION SYSTEM

CLAIM OF PRIORITY

This application is a continuation of U.S. patent application Ser. No. 16/449,232, filed Jun. 21, 2019, which is hereby incorporated by reference herein in its entirety.

BACKGROUND

The present application generally relates to the field of camera, and in particular, relates to methods and systems for multiple camera calibration in a distributed camera system.

A camera model is a function that maps pixels with known Z-coordinate to the real-world coordinates. For example, the function takes (Xpx, Ypx) with given Zft and maps it to (Xft, Yft). The camera model can be further described with other parameters such as lens characteristics, camera height and horizon, camera location and orientation. The parameters are used to calibrate a camera. Typically, a user provides a correspondence between pixels and real-world points. A calibration algorithm determines the model parameters based on the correspondence. However, large facilities can include many cameras (e.g., over 1.00 cameras). Manual calibration for each camera can be labor intensive especially for many cameras.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Example methods and systems are directed to multiple camera calibration in a distributed camera system. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

Cameras that are disposed throughout a facility have overlapping views. If one camera is calibrated already (seed-camera), calibration information for the neighboring cameras can be computed. The number of cameras that need to be calibrated manually can be drastically reduced. The calibration points from matched points with known z-coordinate can be computed. In one example embodiment, computer vision algorithms can be used to automatically match points using recognizable markers or patterns (e.g., yellow bow, a flashing lamp). A user can move the predefined pattern/marker around in the facility to cover all areas of the facility where the cameras are installed. The computer vision algorithm detects the known pattern in each camera that needs to be calibrated, and one or more neighboring camera which are already calibrated.

In one example embodiment, the present application describes calibrating a seed camera disposed a first location. A second camera, disposed at a second location, detects a physical marker based on predefined characteristics of the physical marker. The physical marker is located within an overlapping field of view between the seed camera and the second camera. The second camera is calibrated based on a combination of the physical location of the physical marker, the first location of the seed camera, the second location of the second camera, a first image of the physical marker generated with the seed camera, and a second image of the physical marker generated with the second cam era.

Figure 1:
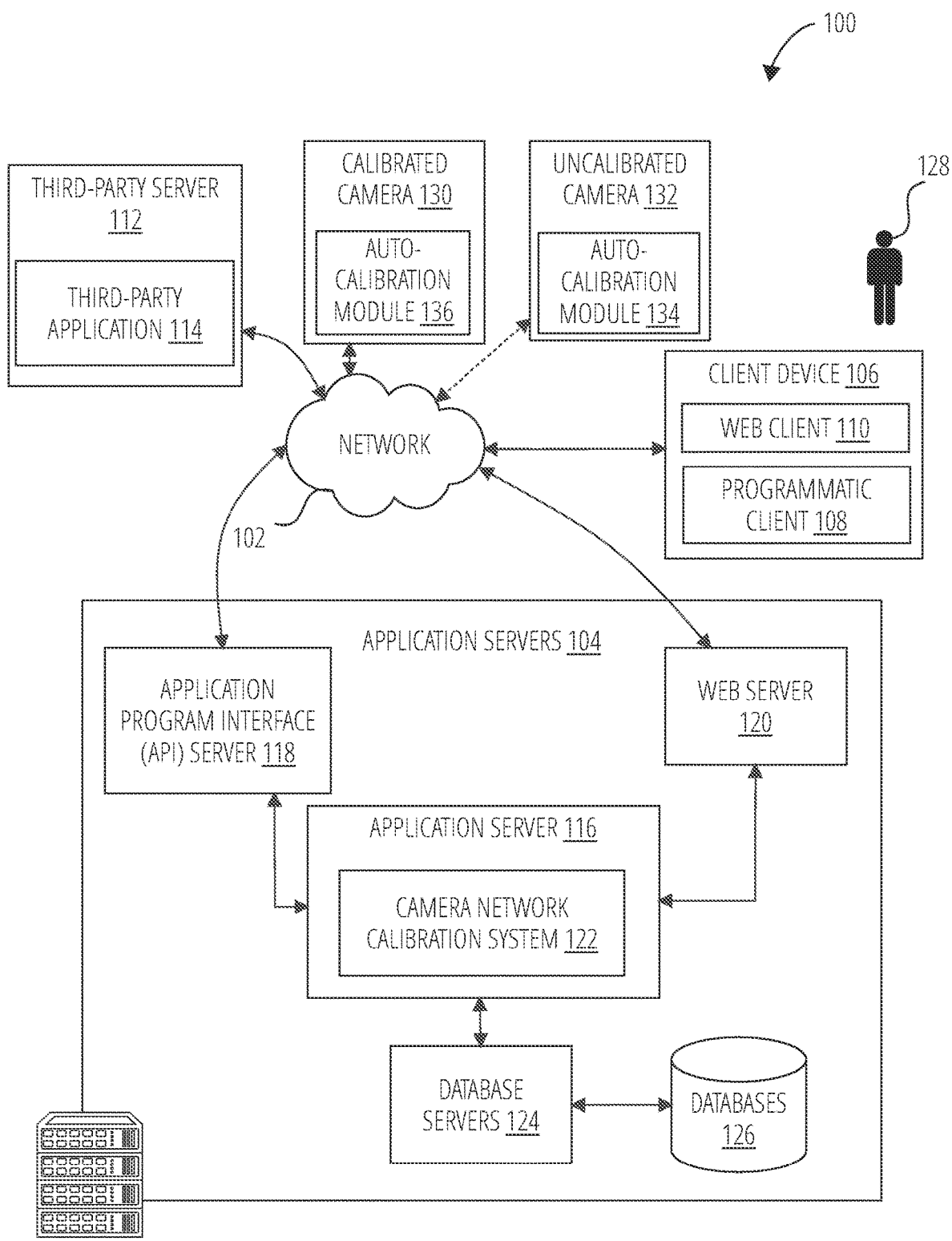
FIG. 1 is a diagrammatic representation of a networked environment in which the present disclosure may be deployed, in accordance with some example embodiments.

FIG. 1 is a diagrammatic representation of a network environment 100 in which some example embodiments of the present disclosure may be implemented or deployed. One or more application servers 104 provide server-side functionality via a network 102 to a networked user device (in the form of a client device 106 of the user 128), a calibrated camera 130, and an uncalibrated camera 132. A web client 110 (e.g., a browser) and a programmatic client 108 (e.g., an "app") are hosted and execute on the client device 106. The client device 106 can communicate with the calibrated camera 130, the uncalibrated camera 132, and application servers 104 via the network 102 or via other wireless or wired means.

The calibrated camera 130 is manually calibrated and is also be referred to as a seed camera. The uncalibrated camera 132 comprises an auto-calibration module 136. The calibrated camera 130 generate image/video data and provides the image/video data to the auto-calibration module 136. The auto-calibration module 136 is configured to communicate the image/video data and other data (e.g., location data of the calibrated camera 130, location of an identified object detected in an image generated by the calibrated camera 130) to the application servers 104. In another example embodiment, the calibrated camera 130 can also provide the data to the uncalibrated camera 132 and the client device 106.

An Application Program Interface (API) server 118 and a web server 120 provide respective programmatic and web interfaces to application servers 104. A specific application server 116 hosts a camera network calibration system 122 that operates with the application server 116.

In one example embodiment, the camera network calibration system 122 receives video/image and location data from the calibrated camera 130. The camera network calibration system 122 detects a marker in the images or video frames from the calibrated camera 130. The camera network calibration system 122 then computes the physical location (also referred to as real-world location/coordinate) of the marker based on the location of the calibrated camera 130 and predefined physical characteristics of the marker. The camera network calibration system 122 receives video/image data from the uncalibrated camera 132. The camera network calibration system 122 detects the marker in the video/image data from the uncalibrated camera 132. The camera network calibration system 122 computes orientation, location, and position of the uncalibrated camera 132 based on the physical location of the marker, predefined physical characteristics of the marker, and the video/image data of the marker from the uncalibrated camera 132. The camera network calibration system 122 calibrates the uncalibrated camera 132 based on the computed orientation, location, and position of the uncalibrated camera 132.

In another example embodiment, the auto-calibration module 136 receives video/image and location data from the calibrated camera 130. The auto-calibration module 136 detects a marker in the images or video frames from the calibrated camera 130. The auto-calibration module 136 then computes the physical location (also referred to as real-world location/coordinate) of the marker based on the location of the calibrated camera 130 and predefined physical characteristics of the marker. The auto-calibration module 134 receives video/image data from the uncalibrated camera 132. The auto-calibration module 134 detects the marker in the video/image data from the uncalibrated camera 132. The auto-calibration module 134 computes orientation, location, and position of the uncalibrated camera 132 based on the physical location of the marker, predefined physical characteristics of the marker, and the video/image data of the marker from the uncalibrated camera 132. The auto-calibration module 134 calibrates the uncalibrated camera 132 based on the computed orientation, location, and position of the uncalibrated camera 132.

The operations performed by the camera network calibration system 122 may be also performed or distributed to another server such as a third-party, server 112. For example, the calibration of the uncalibrated camera 132 may be performed at the third-party server 112.

The web client 110 communicates with the camera network calibration system 122 via the web interface supported by the web server 120. Similarly, the programmatic client 108 communicates with the camera network calibration system 122 via the programmatic interface provided by the Application Program Interface (API) server 118. The third-party application 114 may, for example, be another application to support the camera network calibration system 122 or mine the data from the camera network calibration system 122. For example, the third-party application 114 may access location information, image/video data from the calibrated camera 130 and uncalibrated camera 132. The application server 116 is shown to be communicatively coupled to database servers 124 that facilitates access to an information storage repository or databases 126. In an example embodiment, the databases 126 includes storage devices that store information to be published and/or processed by the camera network calibration system 122.

Figure 2:
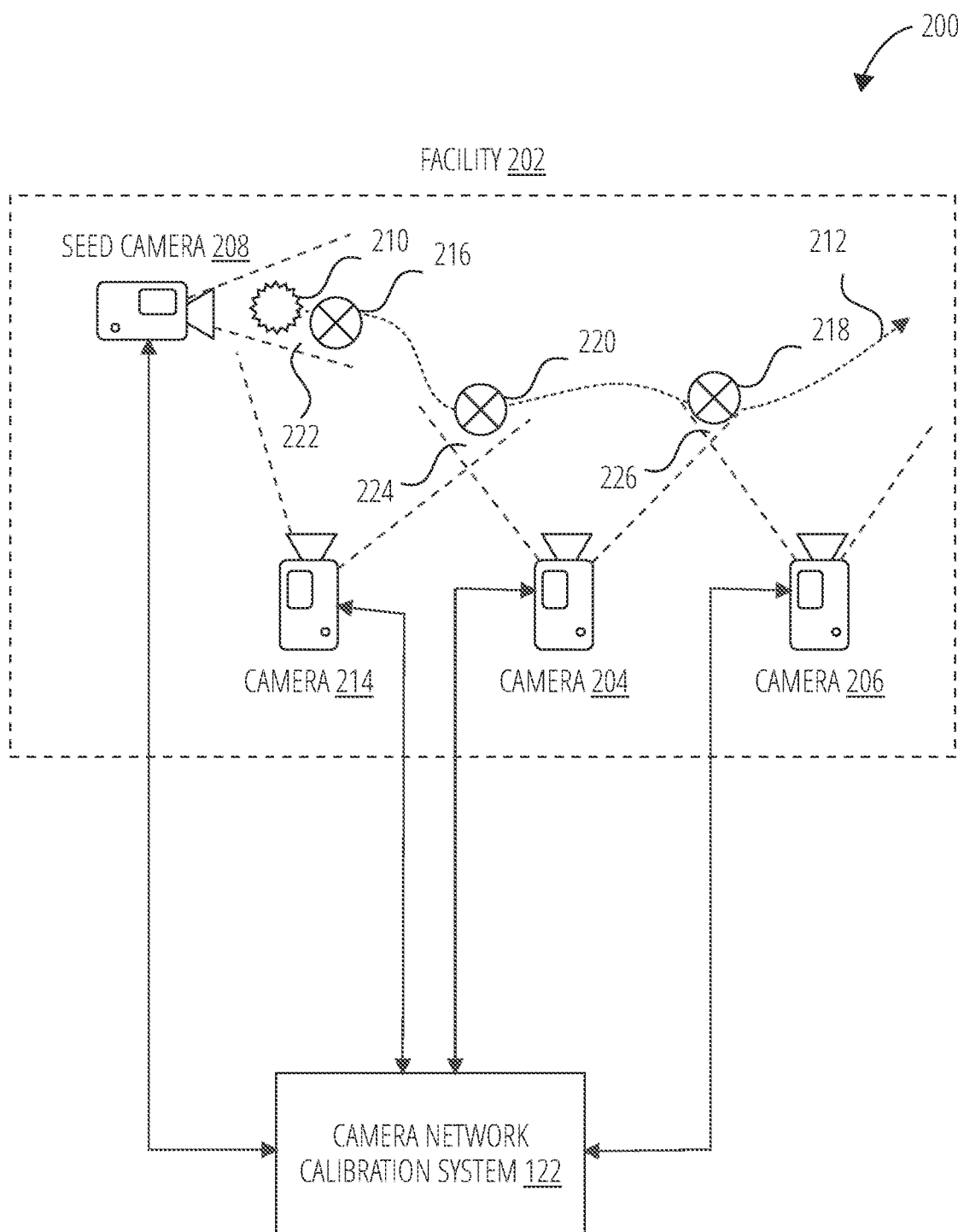
FIG. 2 illustrates an example operation of a camera auto-calibration system in accordance with one embodiment.

FIG. 2 illustrates an example operation of a camera auto-calibration system in accordance with one embodiment. The camera auto-calibration system 200 comprises a camera network calibration system 122, a facility 202, a camera 204, a camera 206, a seed camera 208, a marker 210, a travel path 212, and a camera 214.

The facility 202 may be, for example, a building, a retail space, or an office space. A network of cameras (e.g., seed camera 208, uncalibrated camera 214, uncalibrated camera 204, uncalibrated camera 206) are placed throughout the facility 202 at different locations and different orientations. For example, some cameras may point to different angles throughout the facility 202 to maximize coverage of the facility 202. In one example embodiment, the cameras communicate with camera network calibration system 122. In another example embodiment, the cameras can communicate with each other (e.g., peer-to-peer network) without communicating via the camera network calibration system 122. For example, seed camera 208 can communicate with camera 206 without having to rely on the camera network calibration system 122 as an intermediary node.

The seed camera 208 refers to a camera that is been manually calibrated by a user of the camera network calibration system 122. For example, the orientation, location, and position of the seed camera 208 is known, preset, or predetermined. The seed camera 208 captures an image/video of the marker 210.

The marker 210 refers to a predefined physical object that is recognizable. The predefined physical object has predefined characteristics. For example, the marker 210 includes a lamp with a preset height, a preset size and shape (e.g., a spherical light bulb on top of a post), and a preset visual pattern (e.g., toggled off and on with a preset frequency). In another example embodiment, the marker 210 includes a physical object that appears mostly the same from different viewpoint angles (e.g., for example, a sphere or a cylindrical object), The marker 210 travels along a travel path 212 within the facility 202. In one example, a person may move the marker 210 around the facility 202 to reach different parts of the facility 202.

At travel position 216, the marker 210 is located within an overlapping field of view 222 of the seed camera 208 and the uncalibrated camera 214. In one example embodiment, the camera network calibration system 122 determines the physical location of the marker 210 at travel position 216 based on the image produced by the calibrated seed camera 208. The camera network calibration system 122 computes the location, orientation, and position of the camera 214 based on the image of the marker 210 (produced by the camera 214) at travel position 216 and the known physical location of the marker 210 (determined by the seed camera 208). The camera network calibration system 122 calibrates the camera 214 based on the computed location, orientation, and position of the camera 214.

At travel position 220, the marker 210 is located within an overlapping field of view 224 of now calibrated camera 214 and uncalibrated camera 204. In one example embodiment, the camera network calibration system 122 determines the physical location of the marker 210 at overlapping field of view 224 based on the image produced by calibrated camera 214. The camera network calibration system 122 computes the location, orientation, and position of the camera 204 based on the image of the marker 210 (produced by the camera 204) at travel position 220 and the known physical location of the marker 210 (determined by camera 214). The camera network calibration system 122 calibrates the camera 204 based on the computed location, orientation, and position of the camera 204.

At travel position 218, the marker 210 is located within an overlapping field of view 226 from now calibrated camera 204 (and seed camera 208) and uncalibrated camera 206. In one example embodiment, the camera network calibration system 122 determines the physical location of the marker 210 at travel position 218 based on the image produced by calibrated camera 204. The camera network calibration system 122 computes the location, orientation, and position of the camera 206 based on the image of the marker 210 (produced by the camera 206) at travel position 218 and the known physical location of the marker 210 (determined by camera 204), The camera network calibration system 122 calibrates the camera 206 based on the computed location, orientation, and position of the camera 206.

In another example embodiment, the seed camera 208 determines the physical location of the marker 210 at travel position 216 based on the image produced by the calibrated seed camera 208, The seed camera 208 communicates the physical location of the marker 210 at travel position 216 to the camera 214. The camera 214 computes the location, orientation, and position of the camera 214 based on the image of the marker 210 (produced by the camera 214) at travel position 216 and the known physical location of the marker 210 (provided by the seed camera 208). The camera 214 calibrates itself based on the computed location, orientation, and position of the camera 214.

In another example embodiment, the now calibrated camera 214 determines the physical location of the marker 210 at overlapping field of view 224 based on the image produced by now calibrated camera 214. The camera 214 communicates the physical location of the marker 210 at travel position 220 to the uncalibrated camera 204. The uncalibrated camera 204 computes the location, orientation, and position of the camera 204 based on the image of the marker 210 (produced by the camera 204) at travel position 220 and the known physical location of the marker 210 (provided by calibrated camera 214). The camera 204 calibrates itself based on the computed location, orientation, and position of the camera 204.

In another example embodiment, the now calibrated camera 204 determines the physical location of the marker 210 at travel position 218 based on the image produced by calibrated camera 204. The calibrated camera 204 communicates the physical location of the marker 210 at travel position 218 to the uncalibrated camera 206. The camera 206 computes the location, orientation, and position of the camera 206 based on the image of the marker 210 (produced by the camera 206) at travel position 218 and the known physical location of the marker 210 (provided by calibrated camera 204). The camera 206 calibrates itself based on the computed location, orientation, and position of the camera 206.

Figure 3:
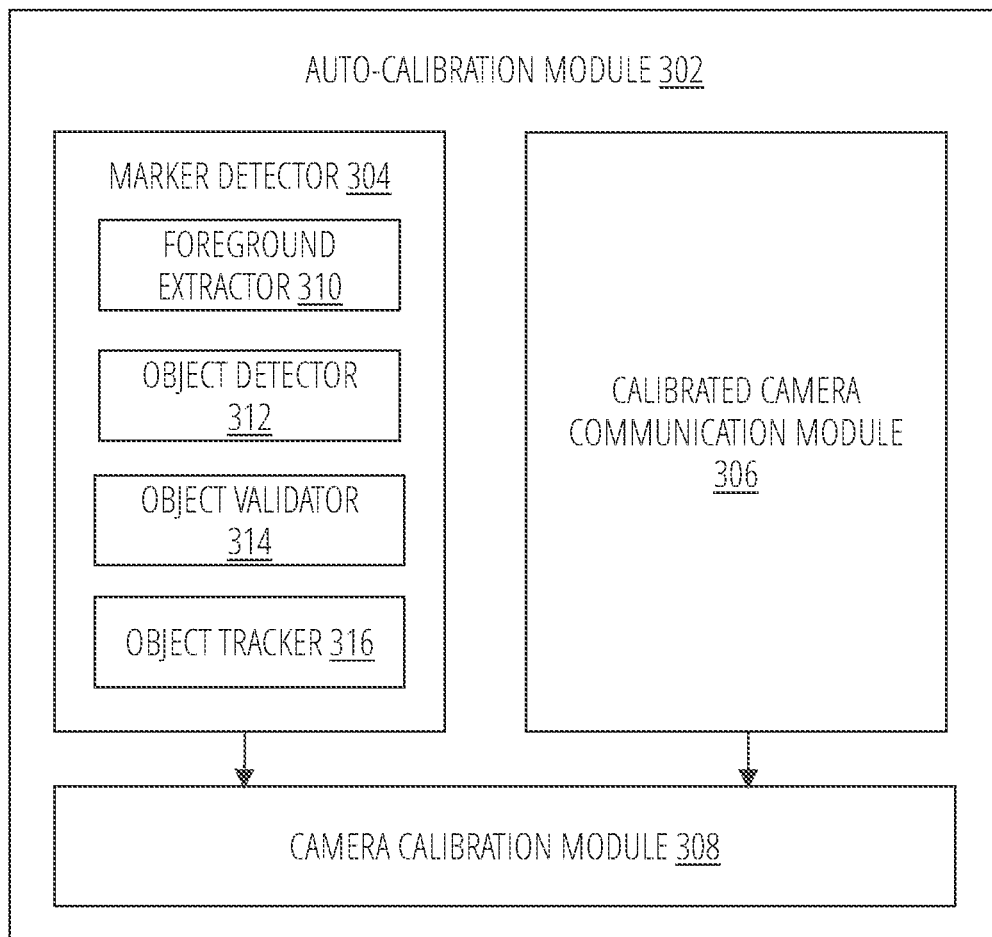
FIG. 3 illustrates an auto-calibration module in accordance with one embodiment.

FIG. 3 illustrates the auto-calibration module 302 of a camera in accordance with one embodiment. The auto-calibration module 302 comprises a marker detector 304, a calibrated camera communication module 306, and a camera calibration module 308.

The marker detector 304 is configured to identify and detect the marker 210 based on predefined characteristics of the marker 210. In one example embodiment, the marker detector 304 includes a foreground extractor 310, an object detector 312, an object validator 314, and an object tracker 316.

The foreground extractor 310 stores the history of pixel intensities for last 'N' frames. For each pixel, if the count of intensity switches (from dark to bright and vice versa) is more than a preset threshold, the pixel is marked as foreground pixel.

The object detector 312 detects objects by computing connected components over the foreground pixels. Connected components below a preset size threshold are discarded. Neighboring components (such as when the object is split up due to noise) can be merged if they are close enough.

The object validator 314 eliminates false objects. There could be other distracting/false objects in the field of view, such as flickering TV screens, sunlight from windows. The object validator 314 helps eliminate such false objects by validating the detected objects based on their shape and size. Since the true shape and size of the marker is already known, that information is used to filter out any false detections. For example, the object validator 314 checks if the shape of the detected object is similar to circular shape. For size-based validation, the object validator 314 uses the calibration information of the calibrated camera (e.g., orientation, position, location), the known lamp height and lamp size. If a detected object does not meet the expected size condition at a given location, that object can be rejected as a false object The object tracker 316 tracks a detected object using path continuity and neighborhood search criteria. Given a previous tracked position, a spatial neighborhood is defined in which the new detected object can appear. All validated current objects detected within that neighborhood are candidates for the true object. The best object is selected as the one which has the maximum size. A combination of other conditions could also be used.

The calibrated camera communication module 306 communicates with other cameras that are calibrated. For example, the calibrated camera communication module 306 receives calibration information from corresponding calibrated camera (e.g., orientation, position, location), the known lamp height, and lamp size, the position of the lamp. In one example embodiment, the calibrated camera communication module 306 communicates with other cameras via a peer-to-peer network. In another example embodiment, the calibrated camera communication module 306 communicates with the camera network calibration system 122 to obtain the calibration information, preset characteristics of the marker 210, and location of the marker 210.

The camera calibration module 308 uses the marker information from the marker detector 304, the calibration information from the calibrated camera communication module 306, the preset characteristics of the marker 210, the location of the marker 210 to calibrate the camera.

Figure 4:
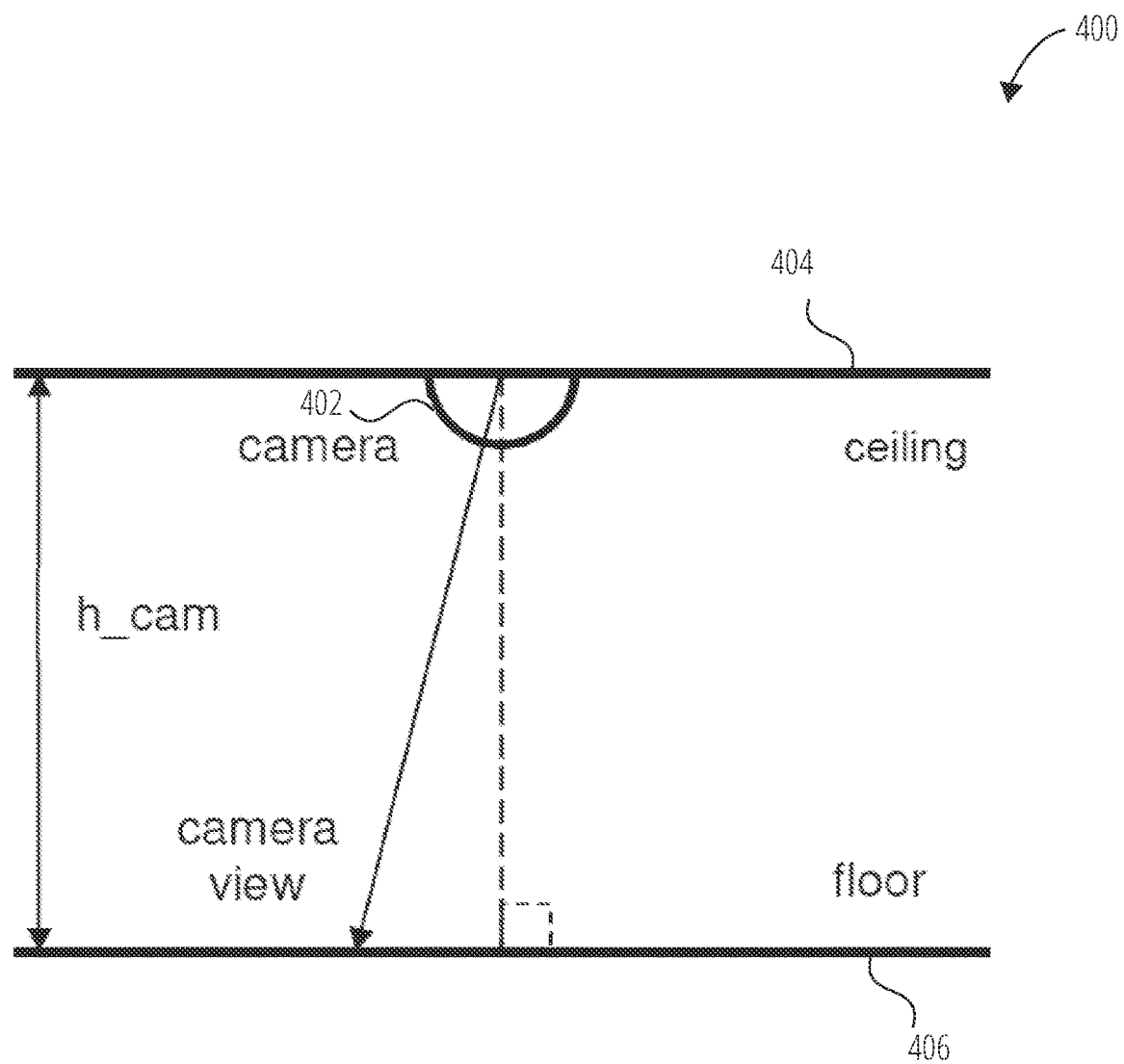
FIG. 4 illustrates an example operation of the camera calibration module in accordance with one embodiment.

FIG. 4 illustrates an example operation of the camera calibration module in accordance with one embodiment. The camera calibration module 308 determines the world-points of an object moving on a plane, given their 2D image coordinates in the fisheye image. A fisheye camera 402 is disposed to a ceiling 404. The height from the ceiling 404 to floor 406 is defined as h_cam.

Figure 5:
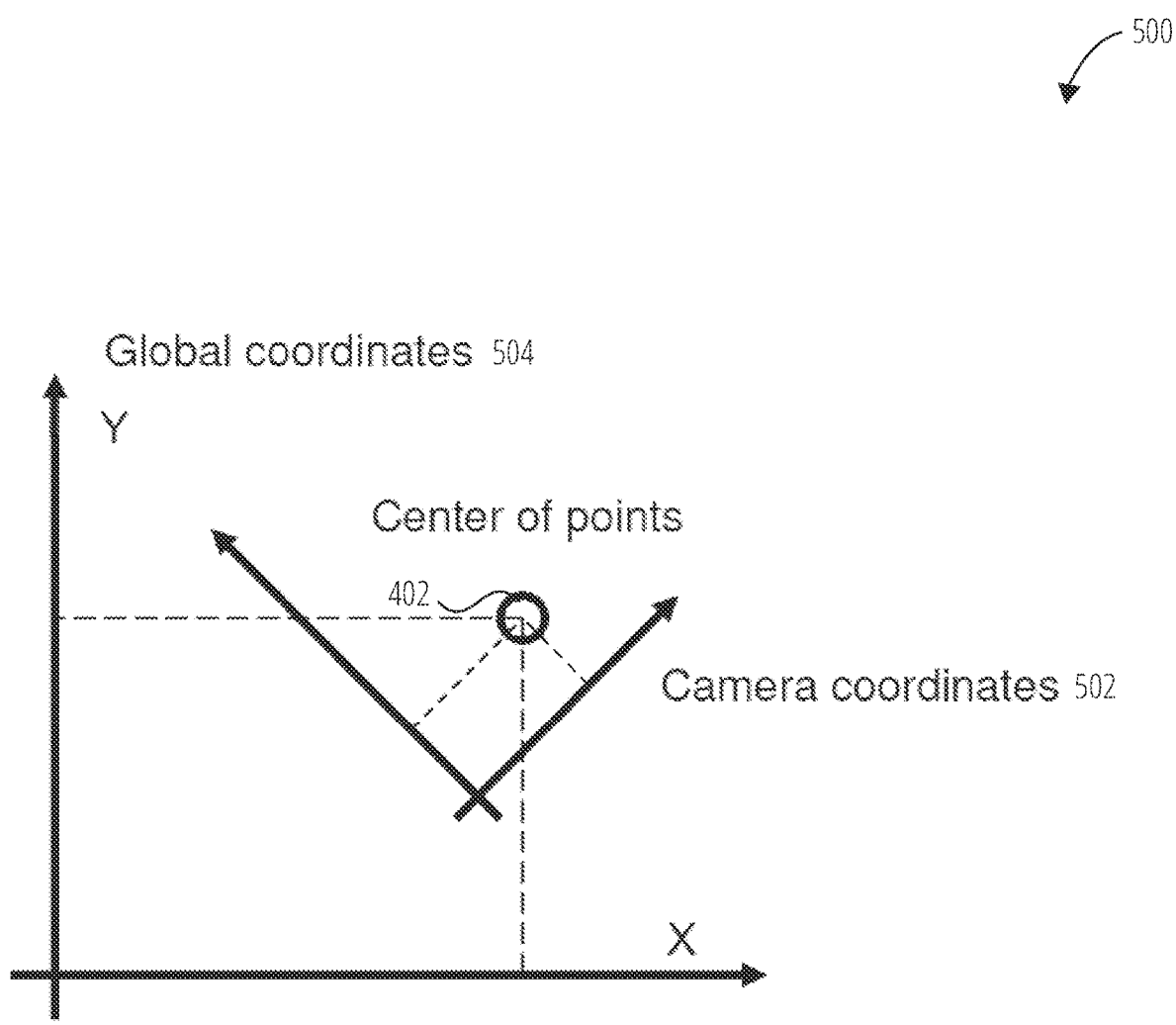
FIG. 5 illustrates an example of camera coordinates and global coordinates in accordance with one embodiment.

FIG. 5 illustrates an example of camera coordinates and global coordinates in accordance with one embodiment. The graph 500 displays a system of camera coordinates 502 within global coordinates 504 relative to the fisheye camera 402.

Figure 6:
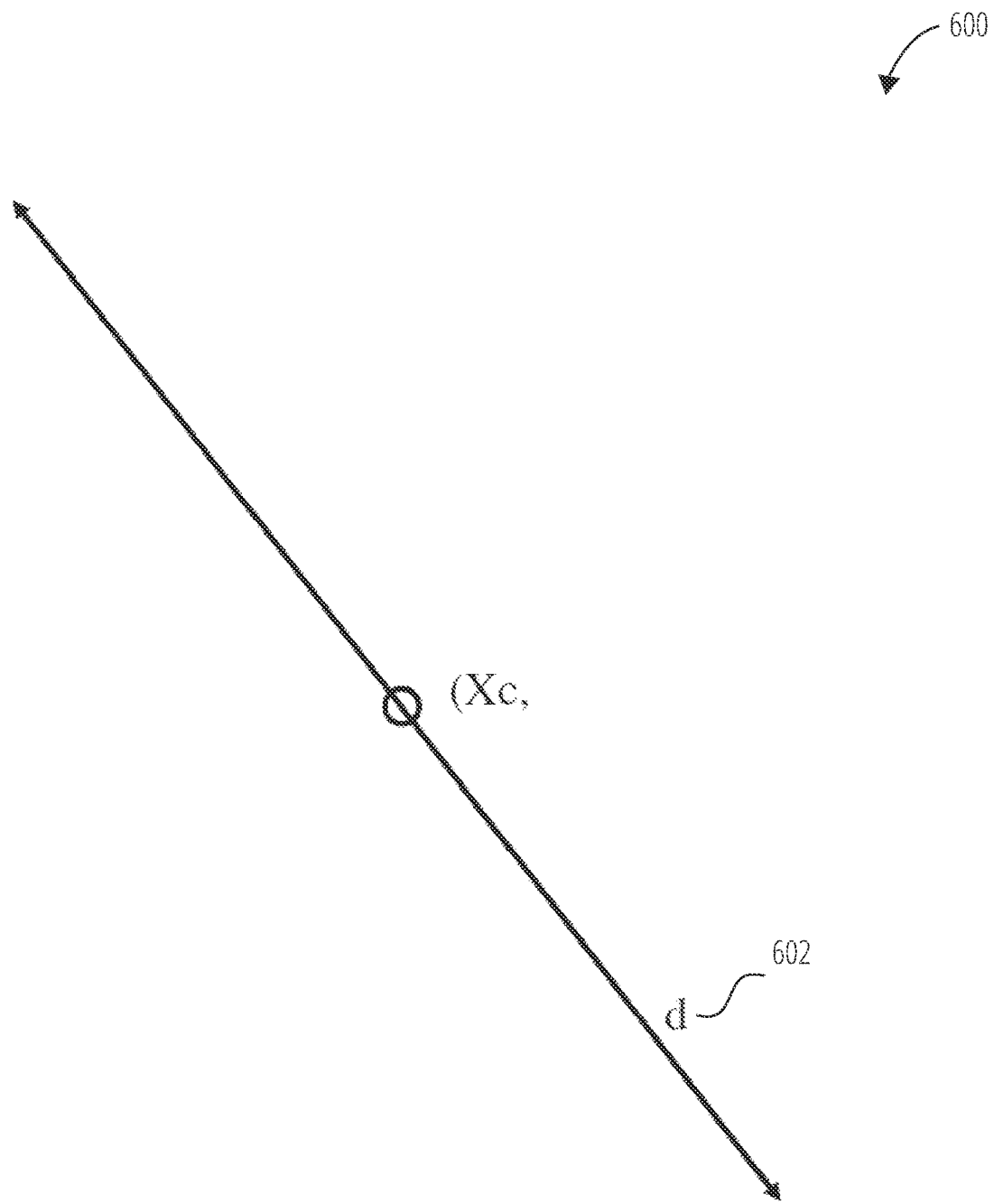
FIG. 6 illustrates an example graph of warped image coordinates of a camera calibration in accordance with one embodiment.

FIG. 6 illustrates an example warped image coordinates of a camera calibration in accordance with one embodiment. The following illustrates parameters for warping/dewarping operation:

pc=(xc, yc)—[in pixels, camera xy-coordinates] point of camera projection to floor, mapped to FishEye coordinates (camera can be mounted not strictly horizontal)

hcam—[in feets] distance from fisheye camera 402 to floor 406;

d 602—[in pixels] diameter of scene view circle in FishEye coordinates;

Shift and Rotation:

θ—rotation of camera in xy-plane;

mint—[in feets, camera xy-coordinates] center (mean_x, mean_y) of dewarping markers;

mext—[in feets, global xy-coordinates] center of markers.

The following illustrates an example operation of a pixels to feets conversion for the fisheye camera 402:

Nonlinear Transform (Dewarping):

$$r = h\text{cam} \cdot \tan(\|p - pc\| \cdot \pi d)$$

$$v = (p - pc) \cdot r / \|p - pc\|$$

p—[in pixels, camera xy-coordinates] any point on warped image.

v—[in feets, camera xy-coordinates] mapping of p

Shift and Rotation:

$$q = R(\theta)(\cdot v - \min t) + \text{mext}$$

R(θ)—rotation matrix q—[in feets, global xy-coordinates] mapping of p

Figure 7:
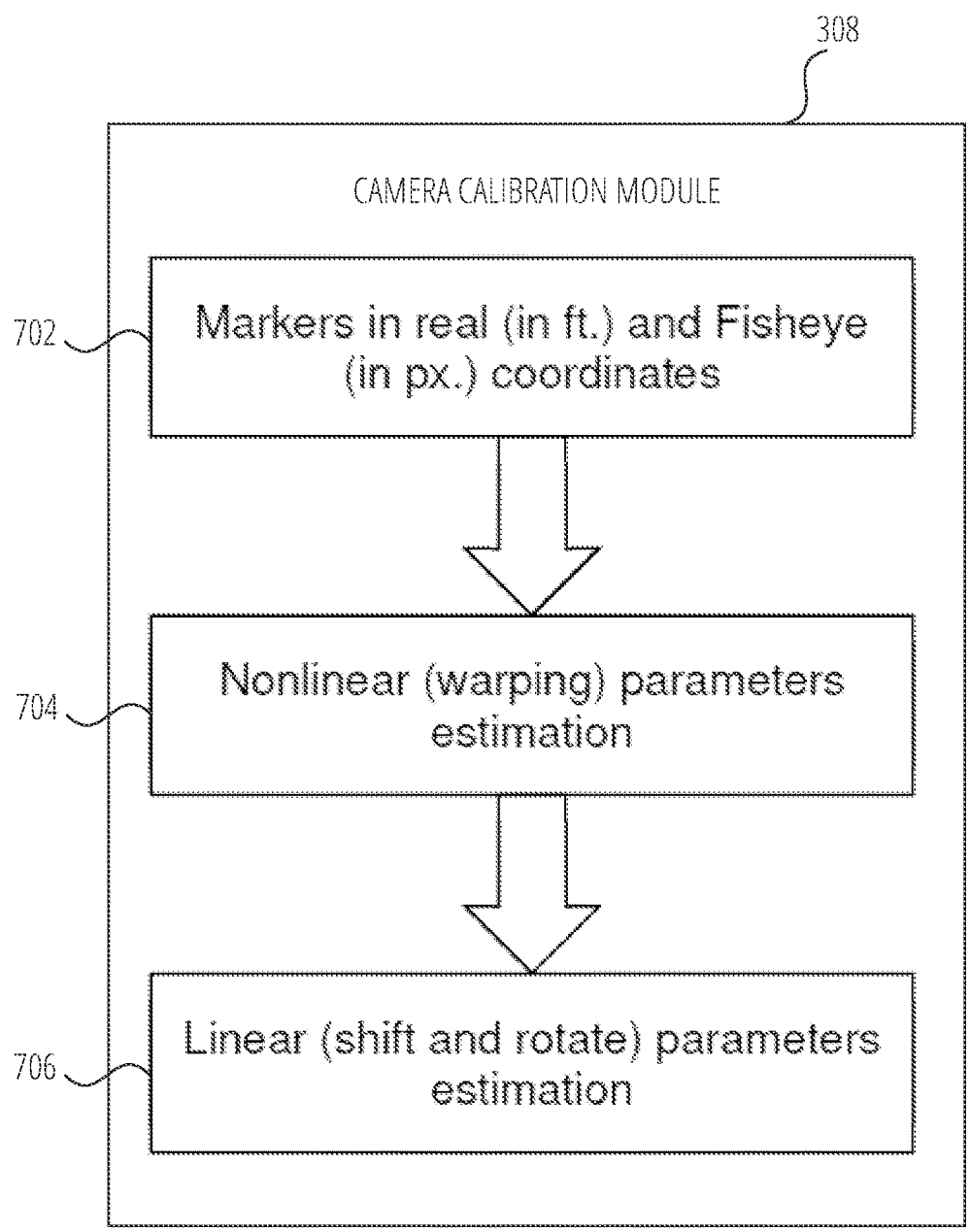
FIG. 7 illustrates a block diagram of a camera calibration module in accordance with one embodiment.

FIG. 7 illustrates a block diagram of a camera calibration module in accordance with one embodiment. The camera calibration module 308 may calibrate the fisheye camera 402 using a set of points or markers on the floor for which the absolute coordinates (in feets) are known. The camera calibration module 308 then specifies the same points in the fisheye coordinates, in pixels. Video overlay may be used.

In one example embodiment, at block 702, the camera calibration module 308 calibrates using markers (in feet) and fisheye coordinates (in pixel). At block 704, the camera calibration module 308 estimates the nonlinear (warping) parameters. At block 706, the camera calibration module 308 estimates the linear (shift and rotate) parameters.

Figure 8:
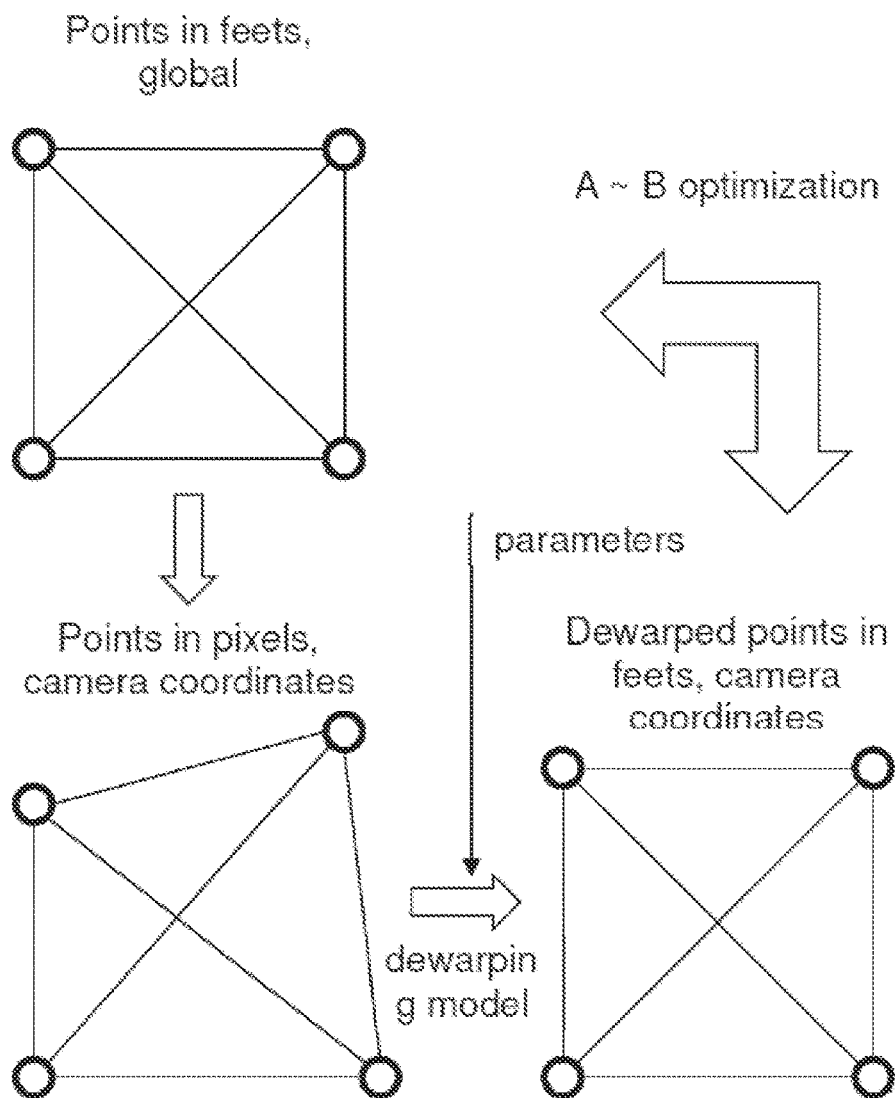
FIG. 8 illustrates an example dewarping operation of the camera calibration module in accordance with one embodiment.

FIG. 8 illustrates an example dewarping operation of the camera calibration module in accordance with one embodiment. A complete graph on N vertices (markers) is created. The set of points in FishEye coordinates is mapped to linear coordinates using dewarping function and set of parameters. Optimization value is mean squared difference between graphs (real and dewarped) edges.

$$L^2 = \Sigma (l_i - l'_i)^2$$

$l_i$—[in feets, global xy-coordinates] distance between two markers $l'_i$—[in feets, camera xy-coordinates] distance between two dewarped markers The following illustrates an example of optimization algorithm (brute force with reduced grid and constraints)"
1. Set window size
2. Find min inside window by grid
3. Set center of new window to argmin
4. Reduce window size
5. Go to 2, repeat N times.

In another example embodiment, the camera calibration module 308 estimates rotation relative to a center of markers in camera and global coordinates. The camera calibration module 308 also estimates camera shift as shift between markers centers in camera and global coordinates.

Figure 9:
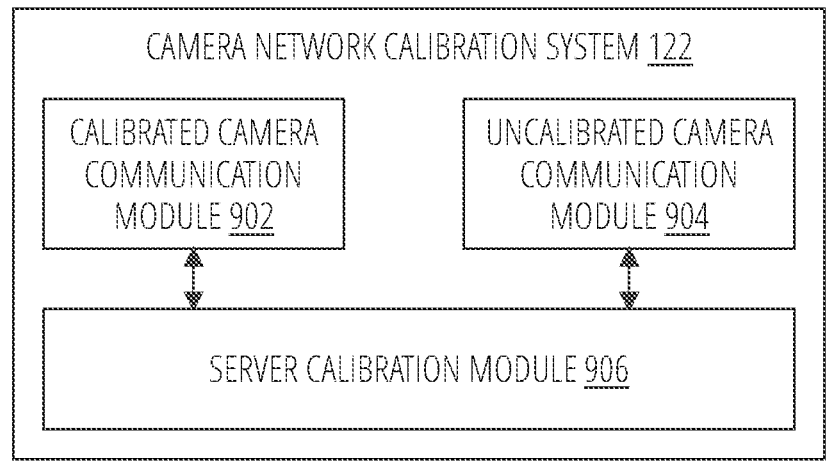
FIG. 9 illustrates a camera network calibration system in accordance with one embodiment.

FIG. 9 illustrates a camera network calibration system 122 in accordance with one embodiment. The camera network calibration system 122 comprises a calibrated camera communication module 902, an uncalibrated camera communication module 904, and a server calibration module 906. The calibrated camera communication module 902 communicates with cameras that are calibrated (e.g., the seed camera 208, and other calibrated cameras) to access calibration information of the cameras and the location of the marker 210 as determined by the calibrated cameras.

The uncalibrated camera communication module 904 communicates with uncalibrated cameras. For example, the uncalibrated camera communication module 904 provides calibration information of the cameras and the location of the marker 210 as determined by the calibrated cameras to the uncalibrated cameras. In another example embodiment, the uncalibrated camera communication module 904 access image/video data from the uncalibrated cameras.

The server calibration module 906 communicates with the calibrated camera communication module 902 and the uncalibrated camera communication module 904. The server calibration module 906 computes a location, position, orientation of an uncalibrated camera based on the information received at calibrated camera communication module 902 and uncalibrated camera communication module 904. The server calibration module 906 provides the calibration information (e.g., location, position, orientation of the uncalibrated camera) to the uncalibrated camera via uncalibrated camera communication module 904.

Figure 10:
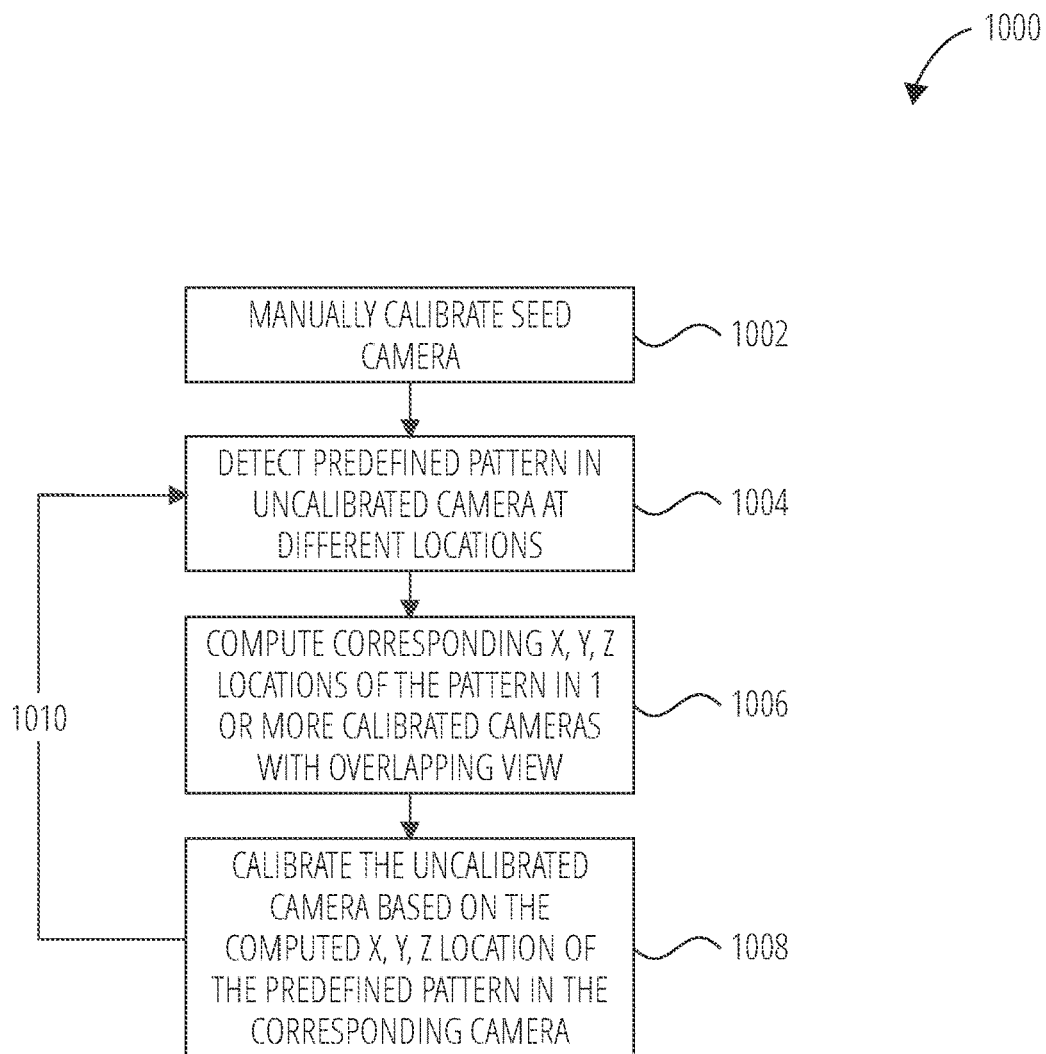
FIG. 10 is a flow diagram illustrating a method for camera auto-calibration in accordance with one embodiment.

FIG. 10 is a flow diagram illustrating a method for camera auto-calibration in accordance with one embodiment. At block 1002, the seed camera 208 is manually calibrated by a user. At block 1004, the uncalibrated camera 132 and the calibrated camera 130 detect a predefined pattern (e.g., marker 210). The uncalibrated camera 132 and the calibrated camera 130 are disposed at different locations, positions, and orientations. The image of the marker 210 is captured by calibrated camera 130 and uncalibrated camera 132 because the marker 210 is located within an overlapping field of view of the calibrated camera 130 and uncalibrated camera 132.

At block 1006, the calibrated camera 130 and other calibrated cameras compute corresponding locations of the marker 210 (e.g., x, y, z coordinates). The calibrated camera has an overlapping view of the marker 210.

At block 1008, the uncalibrated camera 132 is calibrated based on the computed location of the marker 210 (e.g., x, y, z coordinates) provided by the calibrated camera 130. The process is repeated at 1010 to calibrate other non-calibrated cameras (by moving the marker 210 to be within the overlapping field of view of calibrated cameras and uncalibrated cameras).

Figure 11:
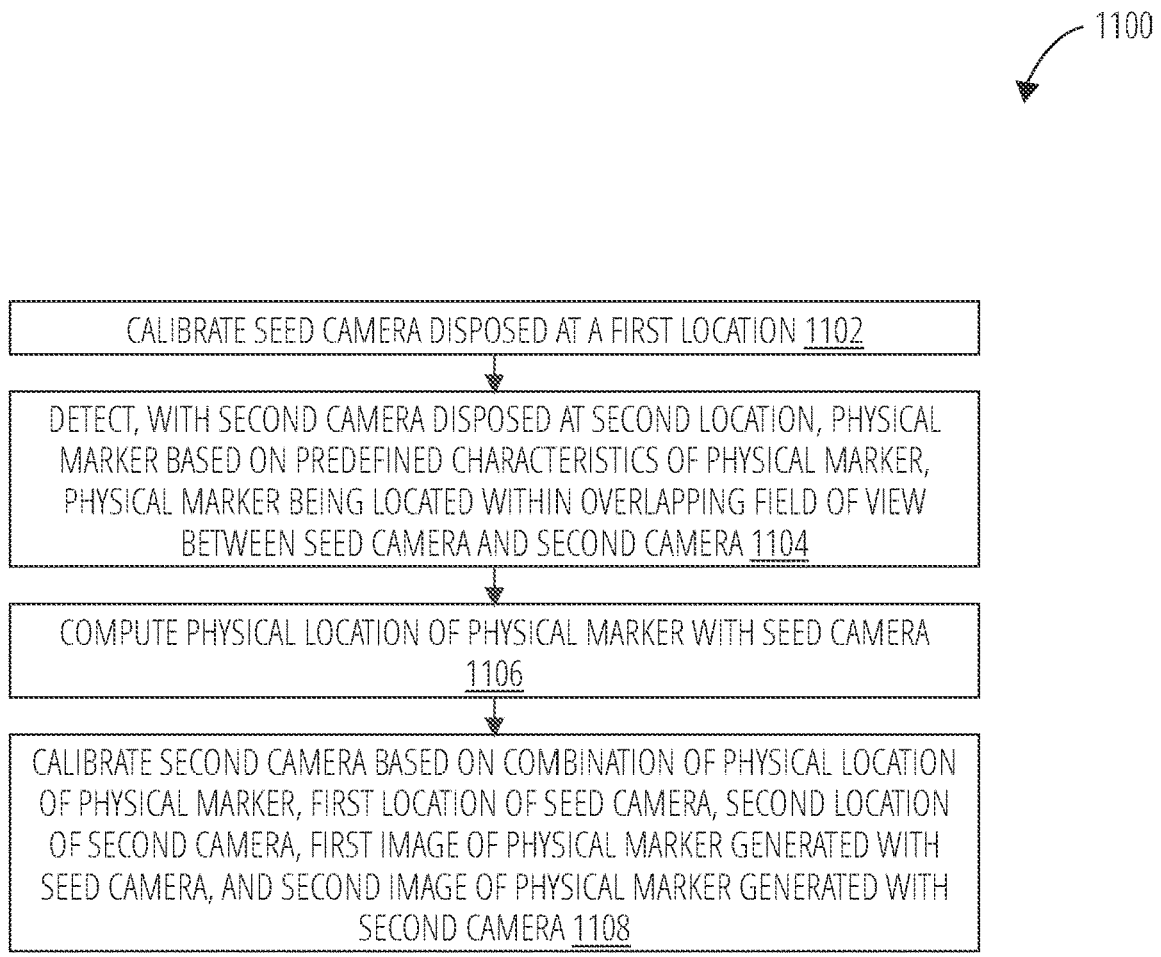
FIG. 11 illustrates a routine in accordance with one embodiment.

FIG. 11 illustrates a routine in accordance with one embodiment. In block 1102, routine 1100 calibrates a seed camera disposed a first location. In block 1104, routine 1100 detects, with a second camera disposed at a second location, a physical marker based on predefined characteristics of the physical marker, the physical marker being located within an overlapping field of view between the seed camera and the second camera. In block 1106, routine 1100 computes a physical location of the physical marker with the seed camera. In block 1108, routine 1100 calibrates the second camera based on a combination of the physical location of the physical marker, the first location of the seed camera, the second location of the second camera, a first image of the physical marker generated with the seed camera, and a second image of the physical marker generated with the second camera.

12 is a diagrammatic representation of the machine 1200 within which instructions 1208 (e.g., software, a program, an application, an applet, an app, or other executable code) for causing the machine 1200 to perform any one or more of the methodologies discussed herein may be executed. For example, the instructions 1208 may cause the machine 1200 to execute any one or more of the methods described herein.

The instructions 1208 transform the general, non-programmed machine 1200 into a particular machine 1200 programmed to carry out the described and illustrated functions in the manner described. The machine 1200 may operate as a standalone device or may be coupled (e.g., networked) to other machines. In a networked deployment, the machine 1200 may operate in the capacity of a server machine or a client machine in a server-client network environment, or as a peer machine in a peer-to-peer (or distributed) network environment. The machine 1200 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1208, sequentially or otherwise, that specify actions to be taken by the machine 1200. Further, while only a single machine 1200 is illustrated, the term "machine" shall also be taken to include a collection of machines that individually or jointly execute the instructions 1208 to perform any one or more of the methodologies discussed herein.

Figure 12:
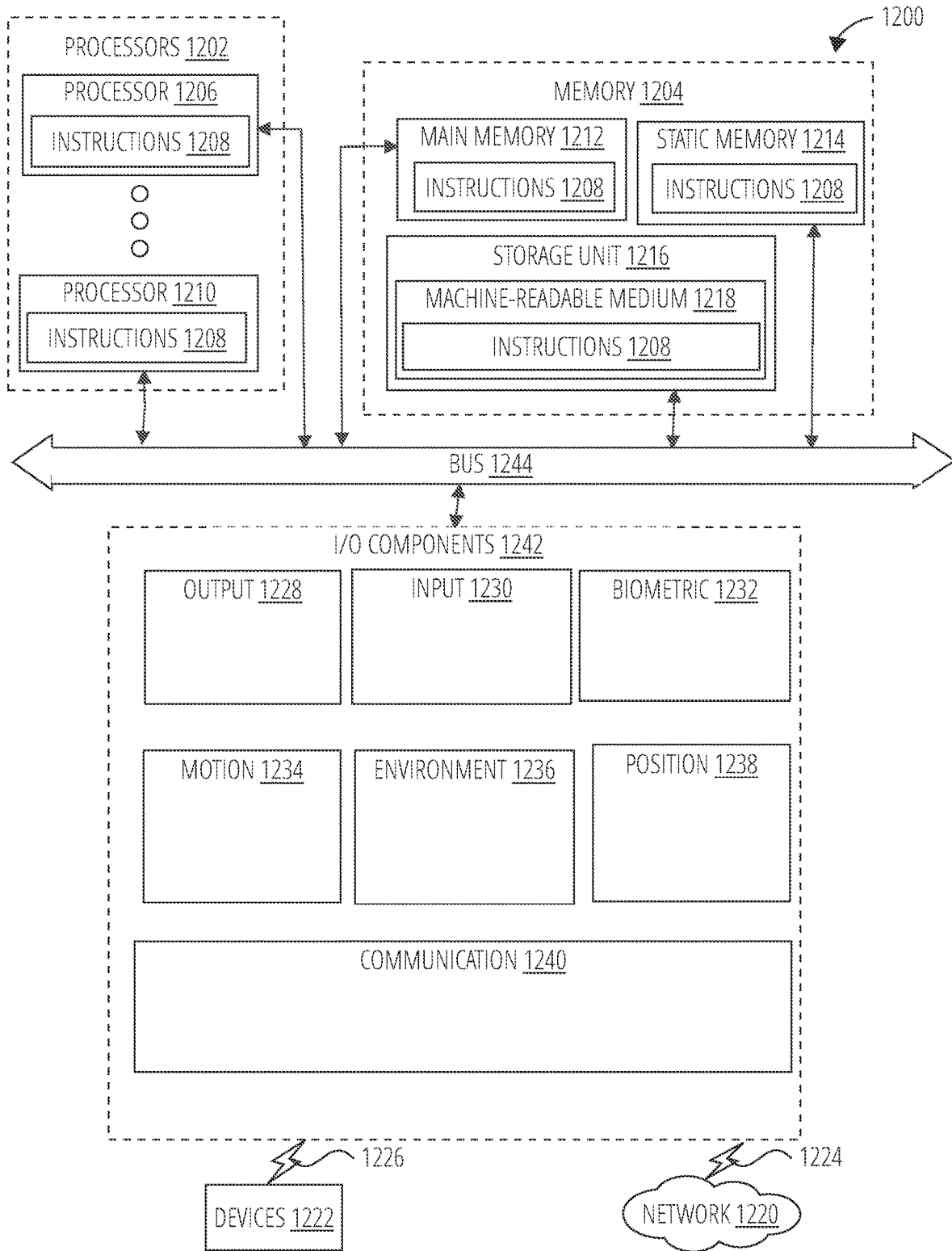
FIG. 12 is a diagrammatic representation of a machine in the form of a computer system within which a set of instructions may be executed for causing the machine to perform any one or more of the methodologies discussed herein, according to an example embodiment.

The machine 1200 may include processors 1202, memory 1204, and I/O components 1242, which may be configured to communicate with each other via a bus 1244. In an example embodiment, the processors 1202. (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 1206 and a processor 1210 that execute the instructions 1208. The term "processor" is intended to include multi-core processors that may comprise two or more independent processors (sometimes referred to as "cores") that may execute instructions contemporaneously, Although FIG. 12 shows multiple processors 1202, the machine 1200 may include a single processor with a single core, a single processor with multiple cores (e.g., a multi-core processor), multiple processors with a single core, multiple processors with multiples cores, or any combination thereof.

The memory 1204 includes a main memory 1212, a static memory 1214, and a storage unit 1216, both accessible to the processors 1202 via the bus 1244. The main memory 1204, the static memory 1214, and storage unit 1216 store the instructions 1208 embodying any one or more of the methodologies or functions described herein. The instructions 1208 may also reside, completely or partially, within the main memory 1212, within the static memory 1214, within machine-readable medium 1218 within the storage unit 1216, within at least one of the processors 1202 (e.g., within the processor's cache memory), or any suitable combination thereof, during execution thereof by the machine 1200.

The I/O components 1242 may include a wide variety of components to receive input, provide output, produce output, transmit information, exchange information, capture measurements, and so on. The specific I/O components 1242 that are included in a particular machine will depend on the type of machine. For example, portable machines such as mobile phones may include a touch input device or other such input mechanisms, while a headless server machine will likely not include such a touch input device. It will be appreciated that the I/O: components 1242 may include many other components that are not shown in FIG. 12. In various example embodiments, the I/O components 1242 may include output components 1228 and input components 1230. The output components 1228 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1230 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 1242 may include biometric components 1232, motion components 1234, environmental components 1236, or position components 1238, among a wide array of other components. For example, the biometric components 1232 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1234 include acceleration sensor components (e.g., accelerometer), gravitation sensor components, rotation sensor components (e.g., gyroscope), and so forth. The environmental components 1236 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1238 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1242 further include communication components 1240 operable to couple the machine 1200 to a network 1220 or devices 1222 via a coupling 1224 and a coupling 1226, respectively. For example, the communication components 1240 may include a network interface component or another suitable device to interface with the network 1220. In further examples, the communication components 1240 may include wired communication components, wireless communication components, cellular communication components, Near Field. Communication (NFC) components, Bluetooth® components (e.g., Bluetooth® Low Energy), components, and other communication components to provide communication via other modalities. The devices 1222 may be another machine or any of a wide variety of peripheral devices (e.g., a peripheral device coupled via a USB).

Moreover, the communication components 1240 may detect identifiers or include components operable to detect identifiers. For example, the communication components 1240 may include Radio Frequency Identification (UM) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph; MaxiCode, PDF417, Ultra Code, UCC RSS-2D bar code, and other optical codes), or acoustic detection components (e.g., microphones to identify tagged audio signals). In addition, a variety of information may be derived via the communication components 1240, such as location via Internet Protocol (IP) geolocation, location via Wi-Fi® signal triangulation, location via detecting an NFC beacon signal that may indicate a particular location, and so forth.

The various memories (e.g., memory 1204, main memory 1212, static memory 1214, and/or memory of the processors 1202) and/or storage unit 1216 may store one or more sets of instructions and data structures (e.g., software) embodying or used by any one or more of the methodologies or functions described herein. These instructions (e.g., the instructions 1208), when executed by processors 1202, cause various operations to implement the disclosed embodiments.

The instructions 1208 may be transmitted or received over the network 1220, using a transmission medium, via a network interface device (e.g., a network interface component included in the communication components 1240) and using any one of a number of well-known transfer protocols (e.g., hypertext transfer protocol (HTTP)). Similarly, the instructions 1208 may be transmitted or received using a transmission medium via the coupling 1226 (e.g., a peer-to-peer coupling) to the devices 1222.

Although an embodiment has been described with reference to specific example embodiments, it will be evident that various modifications and changes may be made to these embodiments without departing from the broader scope of the present disclosure. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed. Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A computer-implemented method comprising:
    identifying a reference object depicted in a second image captured with a second camera that is disposed at a second location, the second camera uncalibrated at the second location;
    computing calibration parameters of the second camera based on the second image and a first image captured with a first camera, the first camera calibrated and disposed at a first location, the reference object located within an overlapping field of view between the first camera and the second camera; and
    calibrating the second camera based on the calibration parameters of the second camera.

2. The computer-implemented method of claim 1, further comprising:
    determining, based on the first image, a location of the reference object relative to the first camera,
    wherein computing calibration parameters is further based on the location of the reference object relative to the first camera.

3. The computer-implemented method of claim 1, wherein the reference object includes predefined characteristics that render the reference object uniquely distinguishable in the first image and the second image.

4. The computer-implemented method of claim 1, further comprising:
    detecting that the reference object is moving along a path;
    identifying the reference object depicted in a third image captured with a third camera that is disposed at a third location, the third camera uncalibrated at the third location;
    computing calibration parameters of the third camera based on the third image and the second image, the second camera calibrated at the second location, the reference object located within an overlapping field of view between the second camera and the third camera; and
    calibrating the third camera based on the calibration parameters of the third camera.

5. The computer-implemented method of claim 4, wherein the path is one of a randomized path within a facility, a predefined path within the facility, an optimized path within the facility, the first camera disposed at the first location within the facility, the second camera disposed at the second location within the facility, the third camera disposed at the third location within the facility,
  wherein the predefined path is based on known locations of the first, second, and third cameras inside the facility,
  wherein the optimized path includes a least amount of travel to calibrate the second and third camera.

6. The computer-implemented method of claim 1, further comprising:
  generating a calibration indicator that confirms a calibration of the second camera in response to calibrating the second camera at the second location.

7. The computer-implemented method of claim 6, further comprising:
  causing a notification of the calibration indicator at the second camera in response to calibrating the second camera at the second location.

8. The computer-implemented method of claim 1, further comprising:
  generating a non-calibration indicator indicating that the second camera is not calibrated at the second location prior to calibrating the second camera.

9. The computer-implemented method of claim 8, further comprising:
  causing a notification of the non-calibration indicator at the second camera prior to calibrating the second camera.

10. The computer-implemented method of claim 1, further comprising:
  identifying one or more cameras that are not calibrated in a facility.

11. The computer-implemented method of claim 1, wherein calibrating the first camera further comprises:
  receiving parameters related to the first camera based on a combination of lens characteristics of the first camera, three-dimensional coordinates corresponding to the first location of the first camera, and an orientation of the first camera.

12. The computer-implemented method of claim 1, wherein the reference object comprises a physical object with predefined physical characteristics.

13. The computer-implemented method of claim 12, wherein the predefined physical characteristics comprise at least one of a predefined height, a predefined size, and a predefined visual pattern.

14. The computer-implemented method of claim 1, further comprising:
  computing real-world coordinates of the reference object based on an image of the reference object obtained with the first camera and the first location of the first camera.

15. The computer-implemented method of claim 14, further comprising:
  detecting foreground pixels in the first image generated with the first camera;
  detecting the reference object based on the foreground pixels;
  validating the reference object based on at least one of a predefined static height, a shape of the reference object, or a size of the reference; and
  tracking the reference object within images from the first camera and images from the second camera.

16. The computer-implemented method of claim 1, wherein the first camera and the second camera are part of a network of cameras disposed at different locations within a facility.

17. The computer-implemented method of claim 16, further comprising:
  detecting a movement of the reference object along a path throughout the facility, the path covering different overlapping fields of view between calibrated cameras and uncalibrated cameras from the network of cameras.

18. A computing apparatus, the computing apparatus comprising:
  a processor; and
  a memory storing instructions that, when executed by the processor, configure the apparatus to perform operations comprising:
  identifying a reference object depicted in a second image captured with a second camera that is disposed at a second location, the second camera uncalibrated at the second location;
  computing calibration parameters of the second camera based on the second image and a first image captured with a first camera, the first camera calibrated and disposed at a first location, the reference object located within an overlapping field of view between the first camera and the second camera; and
  calibrating the second camera based on the calibration parameters of the second camera.

19. The computing apparatus of claim 18, wherein the operations further comprise:
  determining, based on the first image, a location of the reference object relative to the first camera,
  wherein computing calibration parameters is further based on the location of the reference object relative to the first camera,
  wherein the reference object includes predefined characteristics that render the reference object uniquely distinguishable in the first image and the second image.

20. A non-transitory computer-readable storage medium, the computer-readable storage medium including instructions that when executed by a computer, cause the computer to perform operations comprising:
  identifying a reference object depicted in a second image captured with a second camera that is disposed at a second location, the second camera uncalibrated at the second location;
  computing calibration parameters of the second camera based on the second image and a first image captured with a first camera, the first camera calibrated and disposed at a first location, the reference object located within an overlapping field of view between the first camera and the second camera; and
  calibrating the second camera based on the calibration parameters of the second camera.

* * * * *